United States Patent [19]

Hayashi

[11] Patent Number: 5,364,583
[45] Date of Patent: Nov. 15, 1994

[54] METHOD AND DEVICE FOR REMOVING AN INJECTION-MOLDED PIECE FROM A MOLD

[75] Inventor: Yoichi Hayashi, Kanagawa, Japan

[73] Assignee: Fuji Photo Film Co., Ltd., Kanagawa, Japan

[21] Appl. No.: 18,707

[22] Filed: Feb. 17, 1993

[30] Foreign Application Priority Data

Feb. 28, 1992 [JP] Japan .................................. 4-075857

[51] Int. Cl.⁵ .......................................... B29C 45/43
[52] U.S. Cl. .................... 264/335; 425/556; 425/437; 425/438; 425/444
[58] Field of Search ................. 264/335, 336; 425/556, 425/437, 438, 444

[56] References Cited

U.S. PATENT DOCUMENTS

| | | | |
|---|---|---|---|
| 3,159,875 | 12/1964 | Stutz et al. | 425/437 |
| 4,755,128 | 7/1988 | Alexander et al. | 425/437 |
| 4,777,004 | 10/1988 | Galer | 264/335 |
| 5,145,630 | 9/1992 | Schad | 264/335 |
| 5,185,119 | 2/1993 | Schad et al. | 264/335 |

*Primary Examiner*—Jill L. Heitbrink
*Attorney, Agent, or Firm*—Sughrue, Mion, Zinn, Macpeak & Seas

[57] ABSTRACT

An injection molded piece is removed from a mold by thrust pins. A jet of fluid is directed toward a surface of the piece during removal so as to hold the piece in a proper position on the thrust pins without damaging the piece.

14 Claims, 6 Drawing Sheets

METHOD AND DEVICE FOR REMOVING AN INJECTION-MOLDED PIECE FROM A MOLD

BACKGROUND OF THE INVENTION

1. Field of the Invention

The present invention relates to a method and a device for removing an injection-molded piece from an injection molding die unit and more particularly relates to a method and a device for removing a plastic shutter of a floppy disk cartridge for housing a recording disk from a die unit.

2. Description of the Related Art

Recording disk units such as a magnetic disk unit, an optical disk unit and a photo-magnetic disk unit have recently been widely used because of the ease and simplicity of handling, high ratio of the storage capacity to the volume, as well as other features thereof.

FIG. 5 illustrates a floppy disk unit 1 which is typically used for disks which are 3.5 inches in diameter. The unit 1 includes upper and lower square half cartridge bodies 2 and 3, which are injection-molded of an ABS resin or the like, an annular center plate 4, and a magnetic disk 5 rotatably supported inside the cartridge bodies. The disk 5 is a magnetic flexible medium made of a circular film of a high-molecular substance with a magnetic layer uniformly provided on the surface of the film. The center plate 4 is fixedly fitted in the circular center hole of the disk 5. The central portion of the lower half cartridge body 3 has an opening 7 formed therein through which the shaft of a motor is to be inserted into the square hole 6 of the central portion of the center plate 4. The front portions of the half cartridge bodies 2 and 3 have magnetic head insertion slots 8 formed therein through which a magnetic head and a head support are to be inserted into the unit 1 to write or read information into or from the disk 5.

The unit 1 also includes a slide shutter 20 fitted on the half cartridge bodies 2 and 3 so that the shutter can be slid to uncover the magnetic head insertion slots 8 of the bodies or cover same to prevent dust or the like from entering into the unit through the insertion slots 8 and from clinging to the magnetic disk 5. The shutter 20 is a U-shaped thin metal sheet such as a stainless steel sheet, and has a projection formed near the central portion thereof which is fitted in a guide groove formed in the outer part of the front portion of the lower half cartridge body 3. The projection can be slid in the groove in such directions as to cover and uncover slots 8 of the bodies 2 and 3. The range 11 of the sliding of the shutter 20 covers the slots 8, and extends on an area of each side surface of the whole cartridge body of the unit 1. The shutter 20 has apertures 10 formed therein so that when the unit 1 is in use, the apertures 10 coincide with the magnetic head insertion slots 8 of the half cartridge bodies 2 and 3 to expose the disk 5 to make it possible to insert the magnetic head and the head support into the magnetic head insertion slots 8 toward the disk. When the unit is not in use, the apertures 10 do not coincide with the magnetic head insertion slots 8 and the shutter 20 closes the magnetic head insertion slots 8 to cover the disk as shown by the two-dot chain line in FIG. 5.

It has recently been proposed that such a slide shutter may be injection-molded of a synthetic resin to reduce the labor and cost necessary for manufacturing the shutter. Japanese Patent Applications (OPI) Nos. 231985/85 and 70981/89 disclose such a device (the term "OPI" as used herein means an unexamined published application"). Generally, a self-lubricating crystalline plastic such as polyacetal is used as the synthetic resin to attain a satisfactory shutter. The temperature of a molding die unit for the injection molding of the shutter is required to be high enough, 70° to 90° C. normally, to grow the crystal grains of the plastic. For that reason, the temperature of the shutter when removed from the die unit immediately after the injection molding is as high as 80° to 100° C.

Since the temperature of the slide shutter when removed from the die unit immediately after the injection molding of the shutter is so high, the shutter can be easily deformed by a low external force. Therefore, it is necessary to exercise great care during removal which makes the removal operation very difficult. The slide shutter can be injection-molded either in a horizontal posture or in a vertical posture inside the die unit. However, it is desirable, because of the stability of the movement of the dies of the die unit and shorter time of removal, to injection-mold the shutter in the vertical posture inside the die unit as shown in FIGS. 6 and 7.

As shown in FIG. 6, the mutually meeting portions of the right and left dies a and b of the die unit have projections 3 and 3a positioned so as to be located near the upper and lower portions of the shutter 20 when it is injection-molded in the vertical posture inside the die unit. After the injection process, the shutter 20 is thrust out from the die unit by upper and lower thrust pins 2, 2 and the right and the left dies a and b are moved apart as indicated by arrows in FIG. 6. As a result of the movement of projections 3a of the left die b, open spaces are left above and below the shutter 20 so that the shutter is not supported at the upper and lower portions thereof by the right and the left dies, but is supported only by the core c of the die unit. For that reason, the shutter 20 tends to tilt as illustrated in FIG. 7. Accordingly, the shutter sometimes drops while being thrust out from the die unit by the pins 2. This can damage the shutter. The tilting also may cause the gas vent portions of the right die a, which are located near the projections 3 of the die, to be contaminated by the resin of the shutter 20. Also, the shutter 20 is more likely to interfere with mechanisms used in the manufacturing process while being conveyed to a next step of processing when its position deviates from a desired position.

SUMMARY OF THE INVENTION

The present invention is directed to solving the above-mentioned problems.

Accordingly, it is an object of the invention to provide a method of stably removing an injection-molded piece such as a plastic shutter from an injection molding die unit while preventing the piece from dropping as it is thrust out from the unit by thrust pins.

It is another object of the invention to provide a device for practicing this method.

In the method according to the invention, the movable members of the injection molding die unit are moved away from each other so that the unit is opened. The injection-molded piece is thereafter thrust out by a prescribed length from the die unit by thrust pins. The piece is then held to be removed from the unit. A fluid is jetted onto the piece in opposition to the thrusting-out so as to push the piece on the pins to hold the piece in a prescribed position proximate a removal device.

In the device according to the invention, the movable members of the injection molding die unit are moved away from each other so that the unit is opened. The piece is thereafter thrust out by the prescribed length from the unit by thrust-out pins. The piece is then held to be taken out from the unit. Holders for removing the piece from the unit, and a nozzle for jetting fluid onto the piece are provided so that the piece is pushed onto the thrust pins by the fluid ejected from the nozzle to hold the piece in prescribed position.

DETAILED DESCRIPTION OF THE PREFERRED EMBODIMENTS

Figure 1:
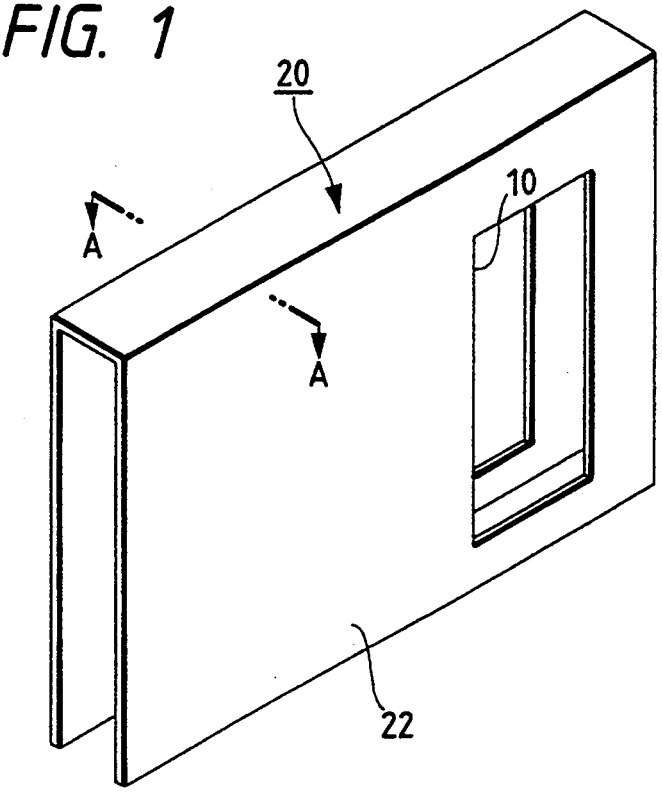
FIG. 1 is a perspective view of a slide shutter for a small-sized floppy disk unit.

FIG. 1 is a perspective view of a slide shutter 20 for a small-sized floppy disk having a 3.5 inch diameter magnetic disk. The shutter 20 is a U-shaped piece injection-molded a polyacetal resin, and has an appropriate projection formed on the inner surface thereof (not illustrated). Apertures 10 are formed in the mutually-facing side portions of the shutter. The shutter 20 is slidably fitted on the cartridge body of the disk unit so that when the unit is in use, the apertures 10 of the shutter coincide with the magnetic head insertion slot and head support insertion slot of the cartridge body to expose the magnetic disk of the unit.

A method, which is a first embodiment, and in which the slide shutter 20 is removed from an injection molding die unit 70, and a device, which is the second embodiment, and is for the above-mentioned removal are described with reference to FIGS. 1-4 below. Similar components are labeled with like reference numerals in FIGS. 1-7.

Figure 2:
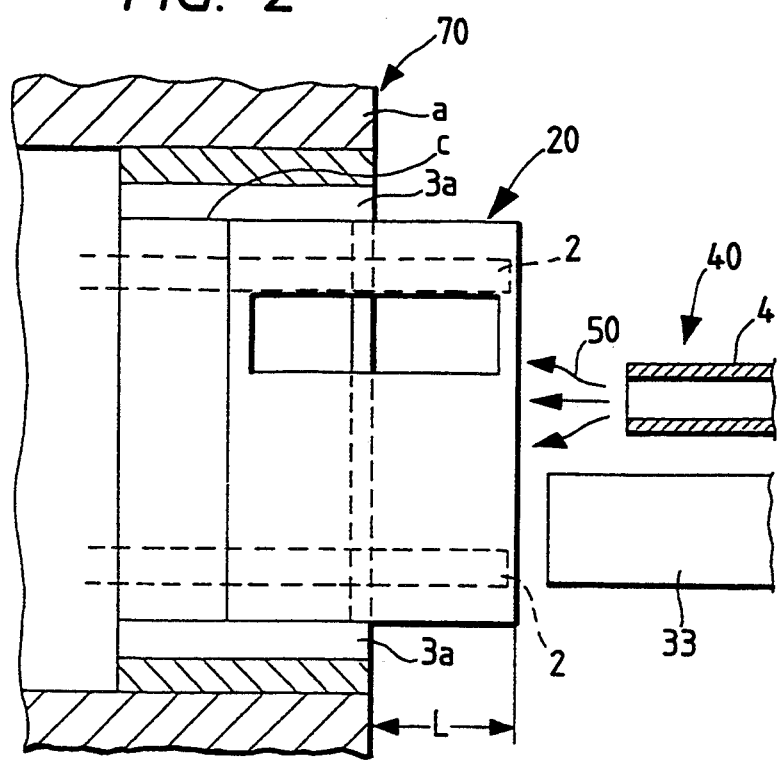
FIG. 2 is a vertical sectional view of the device according to the preferred embodiment.
Figure 3:
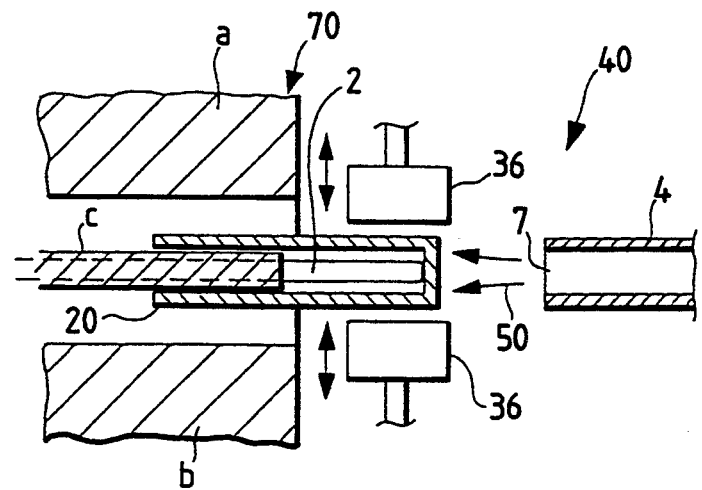
FIG. 3 is a horizontal sectional view of the preferred embodiment.
Figure 4:
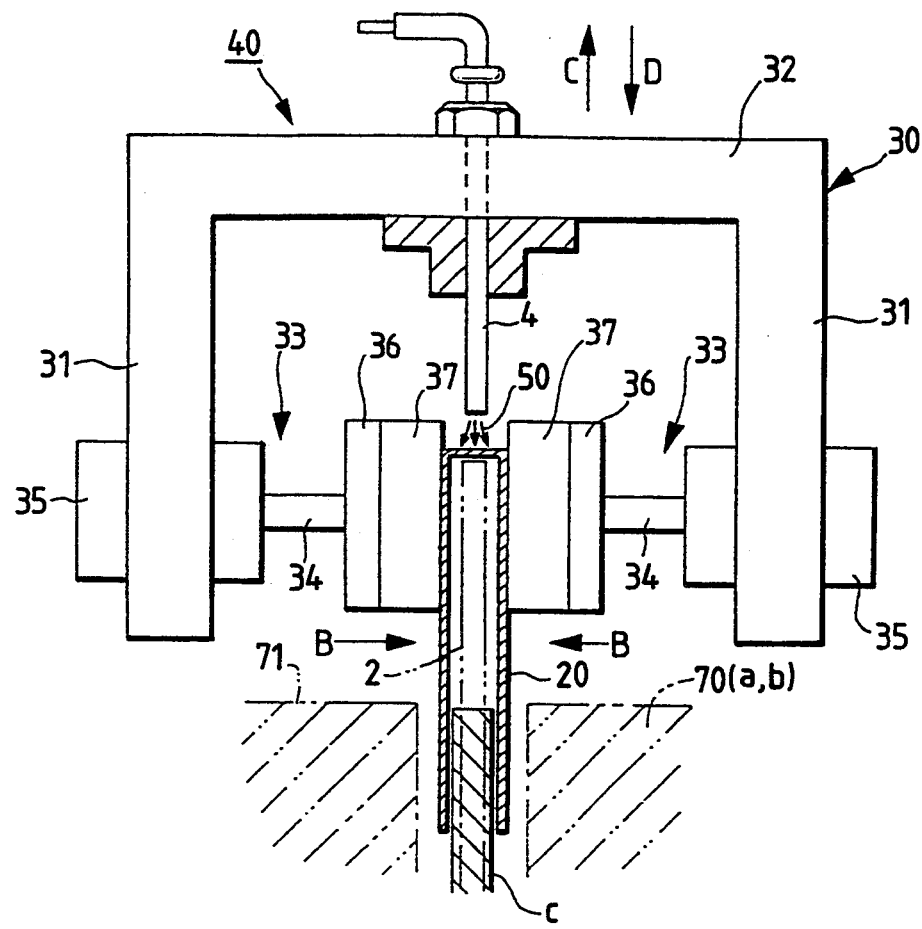
FIG. 4 is a plan view of the preferred embodiment.
Figure 5:
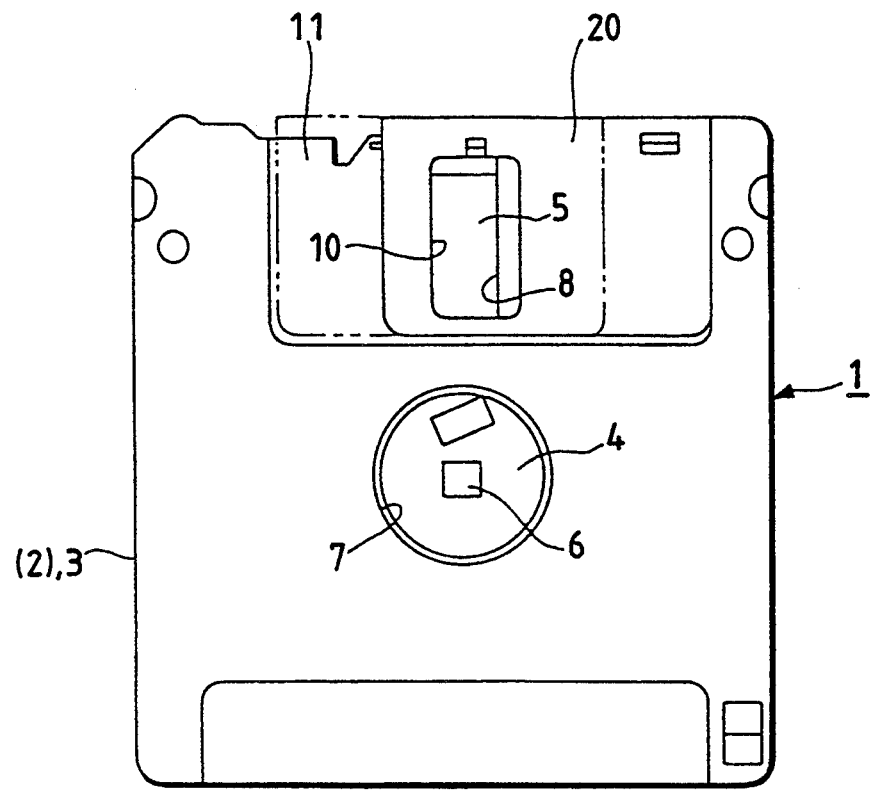
FIG. 5 is a 3.5-inch small-sized floppy disk unit including the shutter illustrated in FIG. 1.
Figure 6:
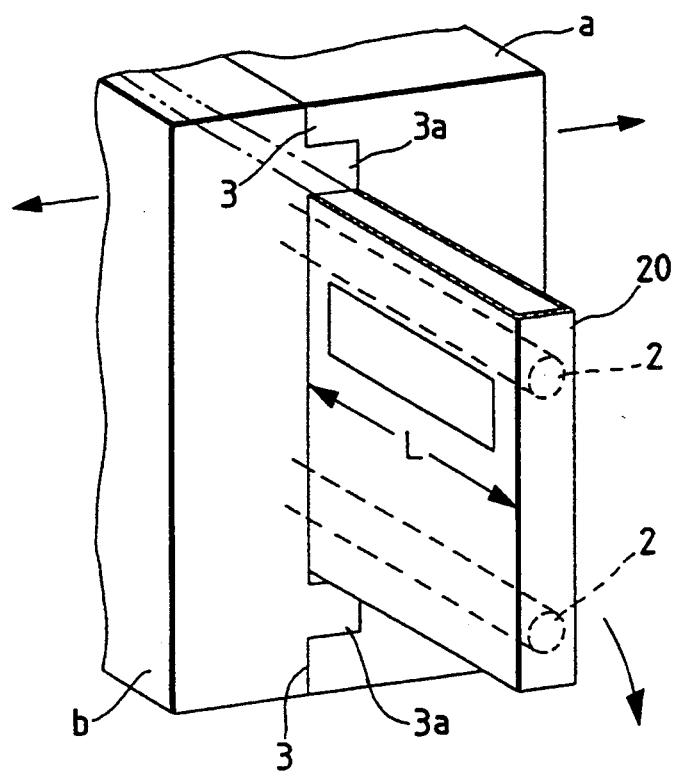
FIG. 6 is a perspective view of the latter shutter and a die unit to illustrate the state where the shutter is being thrust out from the die unit in a conventional manner.
Figure 7:
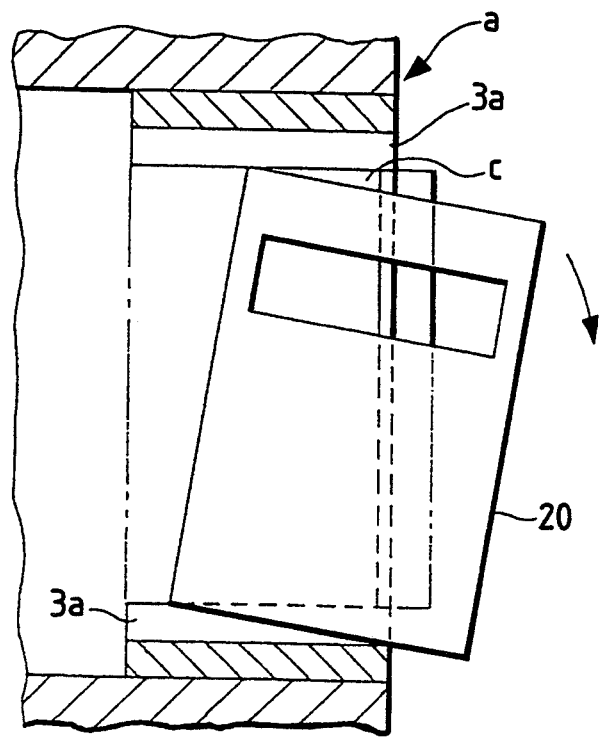
FIG. 7 is a sectional view of the shutter and the die unit to illustrate the state where the shutter is tilted while being thrust out from the unit.

FIG. 2 is a vertical sectional view of a major part of the injection molding die unit 70 illustrating a state wherein thrust pins 2,2 have been advanced. FIG. 3 is a horizontal sectional view of the die unit 70 and the device 40 in a state wherein the shutter 20 is being removed from the die unit by the device. FIG. 4 is a plan view of the device 40.

The device 40 includes an air nozzle 4, a U-shaped support frame 30, and a pair of holders 33, as shown in FIGS. 2, 3 and 4. The air nozzle 4 is for jetting compressed air 50 to the central portion of the slide shutter 20 being thrust out from the die unit 70 by the thrust pins 2 of the device 40 as the right and the left slide dies a and b of the die unit are moved away from each other, as shown in FIG. 3. The holders 33 are for holding the shutter 20 after it has been thrust out from the die unit 70 by the pins 2. The support frame 30 can be moved in between the mutually separated members of the die unit 70 in a direction perpendicular to the plane of FIG. 4, and also in directions C and D which are perpendicular to the parting surfaces 71 of the die unit 70. The air nozzle 4 is attached to the central portion of the frame 30. The holders 33 are attached to the mutually-facing side portions 31 of the frame 30.

The holders 33 include pneumatic cylinders 35 secured to the side portions 31 of the frame 30 and having piston rods 34 which are movable back and forth relative to the bodies of the cylinders. Flat holding plates 36 are secured to the tips of the rods so as to oppose each other, and elastic members 37, made of a spongy rubber, are adhered to the plates. The spongy rubber may be a silicone rubber which is resilient but high in heat resistance. The piston rods 34 move outward from the bodies of the cylinders 35 to move the elastic members 37 toward each other, in directions B shown in FIG. 4, so as to place the members in very light contact with both the sides 22 (FIG. 1) of the shutter 20 to thereby hold the shutter.

Although the device 40 of the first embodiment is designed for holding a single shutter 20, the present invention is not confined thereto but may be designed for the removal and holding of a plurality of shutters simultaneously injection-molded by a molding die unit.

After the shutter 20 is injection-molded inside the die unit 70, the unit is opened and the support frame 30 of the device 40 is then immediately moved down from a waiting position to a holding position in between the mutually opened members of the die unit. The shutter 20 is thereafter thrust out from the die unit 70 by the thrust pins 2 in the core c of the unit. At the same time, or preferably immediately before the completion of the thrust, the jetting of the compressed air 50 from the air nozzle 4 is started so that the air flow pushes the thrust-out shutter 20 onto the pins 2. The pneumatic cylinders 35 are then operated so that the elastic members 37 are moved in the directions B into very light contact with both the sides of the shutter 20. Subsequently, the support frame 30 is moved in the direction C away from the die unit 70 so that the shutter 20 is removed from the unit by the device 40. The frame 30 is subsequently moved horizontally so that the shutter 20 is conveyed to a next step of processing. In that step, the pneumatic cylinders 35 are operated in reverse so that the shutter 20 is released from the device 40.

As mentioned above, the jetting of the compressed air 50 from the air nozzle 4 may be started either simultaneously with, or before, the thrusting of the shutter 20 by the pins 2. The ejection of the air 50 can be continued after the start of the holding action of the holders 33 of the device 40. This helps to cool the shutter 20.

Comparative testing was conducted with respect to a conventional method and a device according to the preferred embodiment. In the experiment, the shutter 20 was repeatedly thrust out from the die unit 70 by each of lengths of 3 mm, 5 mm, 7 mm, 10 mm and 15 mm so as to be taken out by the device 40. The shutter 20 was pushed by the air 50 in the present method, but not pushed by air in the conventional method. When the shutter was thrust out from the die unit by each of lengths of 3 mm and 5 mm so as to be taken out by the device in each of the methods, the shutter did not drop. However, when the shutter was thrust out from the die unit by each of the lengths of 7 mm, 10 mm and 15 mm so as to be taken out by the device 40 in the conventional method, the shutter sometimes dropped so as to assume an improper position in the holders of the device. On the other hand, when the shutter was thrust out from the die unit by each of the lengths of 7 mm, 10 mm and 15 mm so as to be taken out by the device of the present invention as the compressed air was ejected at the pressure of 2 kg/cm$^2$ or more from an air nozzle of 1.5 mm in diameter 0.1 second after the start of the thrusting, the shutter did not drop and was consequently held in a prescribed position by the holders.

Since air is inexpensive, it is preferable as a fluid to be ejected from the nozzle 4. However, other fluids may be used instead of air. These fluids may be kept at a temperature of 50° to 80° C. at the time of the ejection so as not to cause high temperature gradients in the shutter and the die unit. It is preferable that a plurality of air nozzles are provided in positions corresponding to those of the thrust pins 2. However, the single air nozzle 4 in a position corresponding to the middle of the height between the pins 2 works reliably if the velocity of the flow of the air from the nozzle is high enough.

Although the shutter 20 is injection-molded in a vertical posture inside the die unit 70 and then removed in the same posture, the present invention is not confined thereto but may be applied to the case wherein a shutter is injection-molded in a horizontal posture in a die unit and then removed in the same posture.

Figure 8:
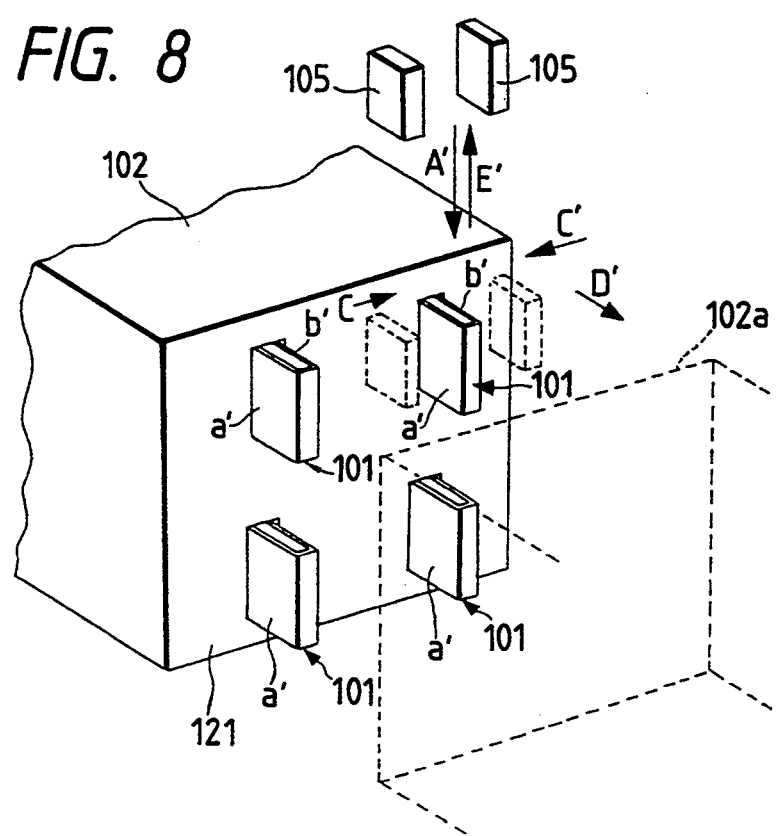
FIG. 8 is a partial perspective view of an injection molding die unit and an injection-molded piece takeout device for an injection-molded piece in a vertical posture to illustrate an injection-molded piece takeout method which is an embodiment of the present invention.
Figure 9:
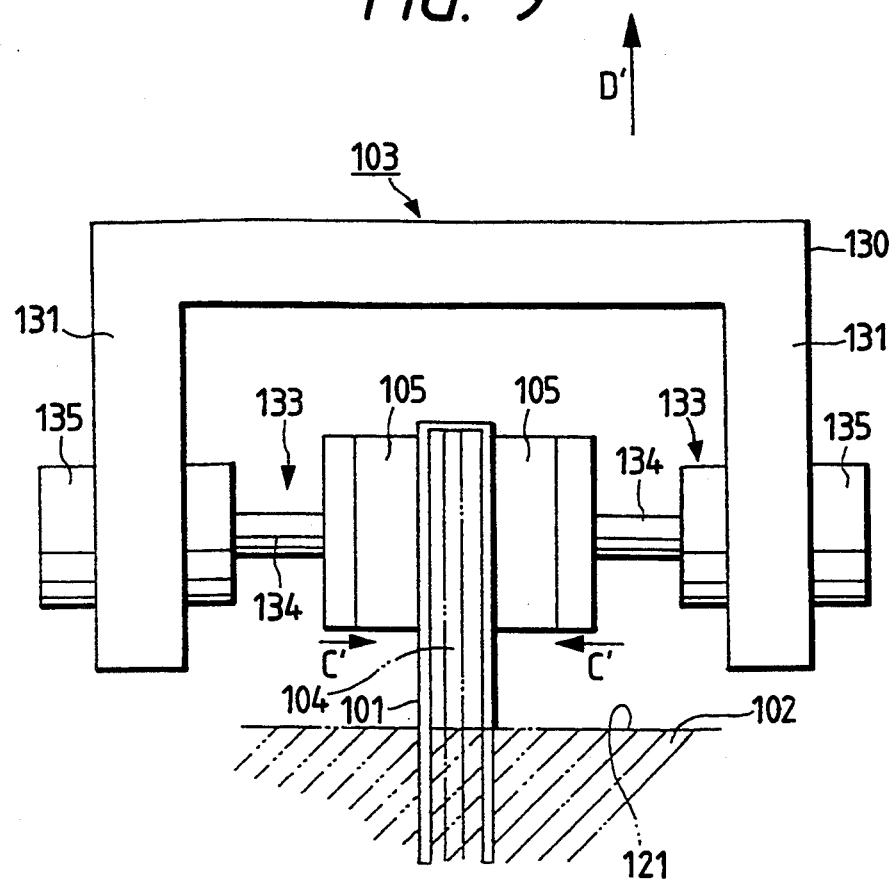
FIG. 9 is a plan view of a major part of the device.

FIG. 8 shows injection-molded pieces 101 which are shutters injection-molded in the molding dies 102 and 102a of an injection molding die unit as the pieces are in vertical postures. In an injection-molded piece takeout method which is one of the embodiments and in which each shutter 101 is taken out from the die unit, the shutter is held at both the held sides a' and b' thereof by the holding members 105 of an injection-molded piece takeout device 103 shown in FIGS. 8 and 9, so that the shutter is taken out from the die unit. The holding members 105 have vertical holding surfaces extending in parallel with the held sides a' and b' of the shutter 101, and are put in stand-by positions over the molding dies 102 and 102a. After a resin is injected into the molding cavities between the dies 102 and 102a and the movable die 102a is then moved away from the fixed die 102, the holding members 105 are moved down in a direction A' to prescribed positions between the dies so that the members can pinch the shutter to hold it. In conjunction with the movement of the holding members 105 to the prescribed positions, thrust-out pins 104 are horizontally moved in the fixed die 102 so that the shutter 101 is thrust out from the parting surface 121 of the die, as shown in FIG. 9. As a result, the thrusted-out portion of the shutter 101 extends between the holding members 105, and the held sides a' and b' of the shutter face the holding surfaces of the holding members. After that, the holding members 105 are moved toward each other in directions C' so that the members hold the shutter 101 at the held sides a' and b' thereof by the holding surfaces of the members. The holding members 105 are then moved away from the fixed die 102 in a direction D' so that the shutter 101 is entirely pulled out from the die. The holding members 105 are finally moved up in a direction E' out of the space between the dies 102 and 102a.

In the method, the holding members 105 are positioned to face the held sides a' and b' of the shutter 101 without colliding against it, although the shutter is thrusted out from the fixed molding die 102 by the thrust-out pins 104 before the holding members are moved down into the space between the dies 102 and 102a. Besides, the holding members 105 are moved down into the space between the dies 102 and 102a while the members are very near the die 102. For these reasons, the movement of the holding members 105 is reduced to shorten the time which it takes to take out the molded shutter 101 from the molding die unit.

FIG. 9 is a plan view of the injection-molded piece takeout devices 103 to illustrate the holding members 105 and the vicinity thereof in detail. The device 103 includes a U-shaped support frame 130 disposed so that it can be moved down into the space between the fixed and movable dies 102 and 102a of the injection molding die unit after the movement of the movable die 102a from the fixed one 102 (which is shown by two-dot chain lines in FIG. 9), and be moved away from the parting surface 121 of the fixed die in the direction D' after the holding of the shutter 101 by the holding members 105. The frame 130 is located very near the parting surface 121 of the fixed die 102 when the frame is moved down into the space between the dies 102 and 102a. The device 103 also includes a pair of holders 133 provided at the mutually facing side portions 131 of the frame 130. The holders 133 include pneumatic cylinders 135 secured to the side portions 131 of the frame 130, piston rods 134 fitted in the cylinders so as to be capable of being protruded and retracted in support members, and the holding members 105 made of plates secured to the rods at the tips thereof and facing each other. The holding members 105 can be moved toward each other in the directions C' into light contact with the held sides a' and b' of the shutter 101 to hold it. The shutter contact surfaces of the holding members 105, which come into contact with the shutter 101, are constituted by an elastic material which is a spongy rubber. The distance between the shutter contact surfaces at the end of the movement of the holding members 105 toward each other is preset to be smaller than the thickness of the shutter 101 by 0.2 mm to 0.8 mm. The spongy rubber may be a silicone rubber high in heat resistance and not higher than 15 degrees in hardness.

After the shutter 101 injection-molded in the die unit is thrusted out from the parting surface 121 of the fixed molding die 102 by the thrust-out pins 104, the pneumatic cylinders 135 secured to the support frame 130 moved into the space between the molding dies 102 and 102a are put in action to protrude the piston rods 134 to move the holding members 105 toward each other in the directions C' into light contact with both the held sides a' and b' of the shutter to hold it in a prescribed position. The frame 130 is then moved away from the parting surface 121 of the die 102 in the direction D' as the shutter 101 remains held by the holding members 105, so that the shutter is entirely pulled out from the die. The frame 130 is thereafter moved up out of the space between the dies 102 and 102a so that the shutter 101 is taken out from the molding die unit. Since the takeout device 103 has the holding surfaces parallel with the held sides of the shutter 101 and the support frame 130 is moved down into the space between the molding dies 102 and 102a as the holding surfaces are very near the held sides, the shutter can be held at the held sides thereby by the device immediately after the movement of the frame into the space so as to shorten the time which it takes to take out the shutter from the die unit.

Figure 10:
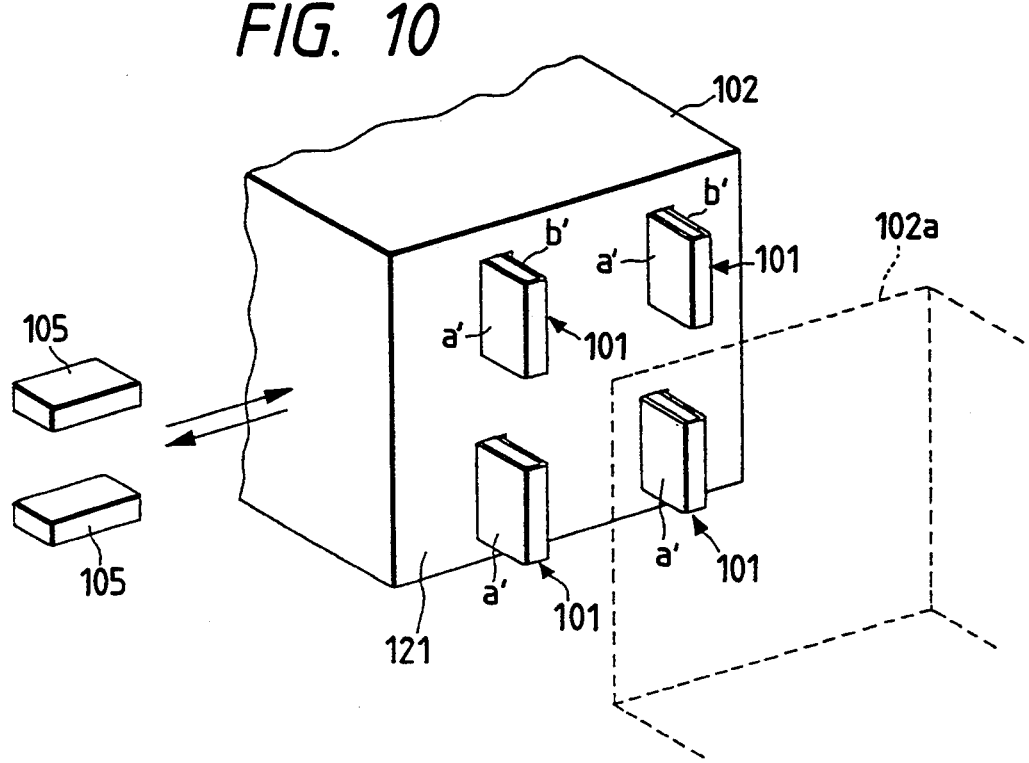
FIG. 10 is a partial perspective view of an injection molding die unit and an injection-molded piece takeout device for an injection-molded piece in a vertical posture to illustrate an injection-molded piece takeout method which is another embodiment of the invention and in which the device is partially moved into the space between the dies of the unit in a direction different from that in the preceding method.

In a method which is another of the embodiments and in which an injection-molded piece is taken out from an injection molding die unit, an injection-molded piece takeout device is set so that the holding members 105 thereof have holding surfaces extending horizontally, as shown in FIG. 10, and are located in stand-by positions alongside the fixed and movable molding dies 102 and 102a of the die unit, and horizontally moved into the space between the dies. After the dies 102 and 102a are moved away from each other, the holding members 105 are horizontally moved into the space between the dies so that a shutter 101 which is the injection-molded piece and is in a vertical posture in the fixed die 102 is held at the top and bottom of the shutter by the holding members. The holding members 105 are then horizontally moved out of the space between the sides 102 and 102a to take out the shutter 101 from the molding die unit. The molded piece takeout device is the same in other constitution and operation as the preceding device.

Figure 11:
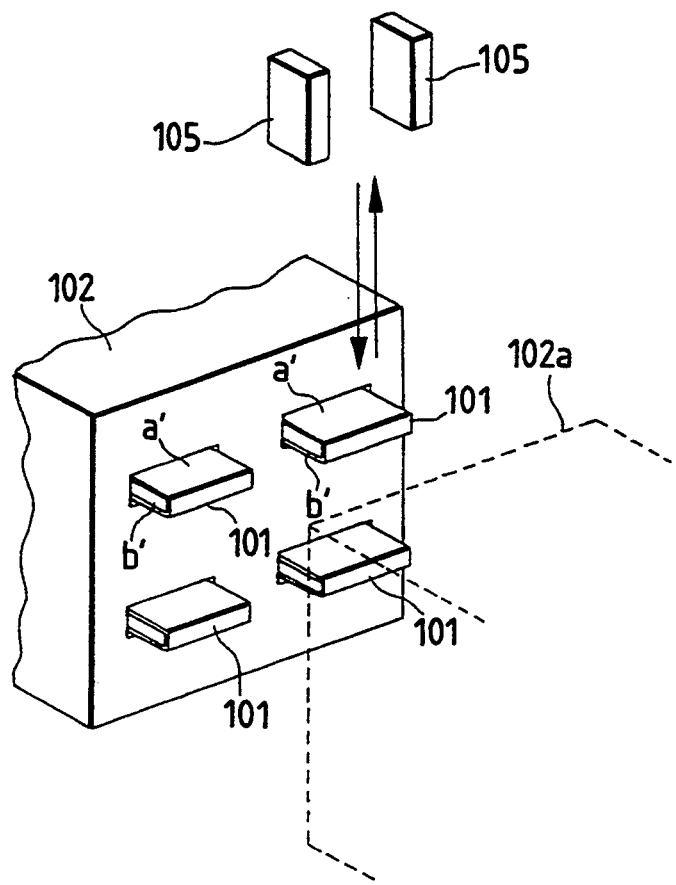
FIG. 11 is a partial perspective view of an injection molding die unit and an injection-molded piece takeout device for an injection-molded piece in a horizontal posture to illustrate an injection-molded piece takeout method which is yet another embodiment of the invention.

In a method which is yet another of the embodiments and in which an injection-molded piece which is a shutter 101 injection-molded in a horizontal posture in the fixed molding die 102 of an injection molding die unit is taken out from the unit, an injection-molded piece takeout device is set so that the holding members 105 thereof are moved down into the space between the fixed and movable molding dies 102 and 102a of the die unit to hold the shutter 101 at the side edges thereof by the vertical holding surfaces of the holding members to take out the shutter from the unit, as shown in FIG. 11. The postures of the shutter 101, the die unit and the takeout device are the same as what results from the 90-degree clockwise rotation of those shown in FIG. 10. The takeout device is the same in other constitution and operation as the device shown in FIG. 8.

Figure 12:
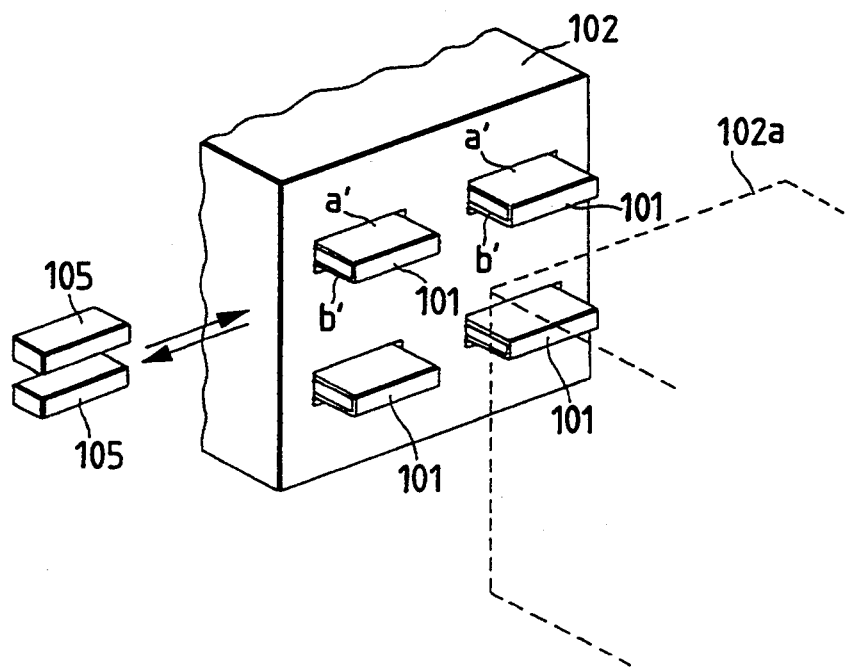
FIG. 12 is a partial perspective view of an injection molding die unit and an injection-molded piece takeout device for an injection-molded piece in a horizontal posture to illustrate an injection-molded piece takeout method which is yet another embodiment of the invention and in which the device is partially moved into the space between the dies of the unit in a direction different from that in the preceding method.

In a method which is yet another of the embodiments and in which an injection-molded piece which is a shutter 101 injection-molded in a horizontal posture in the fixed molding die 102 of an injection molding die unit is taken out from the unit, an injection-molded piece takeout device is set so that the holding members 105 thereof are horizontally moved into the space between the fixed and movable molding dies 102 and 102a of the unit to hold the shutter at the held sides a' and b' thereof by the horizontal holding surfaces of the members, as shown in FIG. 12. The postures of the shutter 101, the die unit and the takeout device are the same as what results from the 90-degree counterclockwise rotation of those shown in FIG. 8. The device is the same in other constitution and operation as the device shown in FIG. 8.

For a shutter for a 3.5-inch small-sized floppy disk cartridge, the holding members 105 of each of the injection-molded piece takeout devices shown in FIGS. 8, 9, 10, 11 and 12 are required to be accurately positioned in the direction of the thickness of the shutter. If the holding members were not accurately positioned in the direction, the members would be very likely to deform the shutter while being moved into the space between the molding dies, as in the conventional method. However, in the methods which are the embodiments, the holding members 105 are moved into the space between the molding dies so that the holding surfaces of the members extend along the held sides of the shutter, as shown in FIG. 8. For that reason, the movement of the members 105 is so stable that the vibration of the members, which accompanies the movement, is prevented from adversely affecting the accuracy the positioning of the holding surfaces of the members in the direction of the thickness of the shutter. This makes it possible to set the accuracy within a range of ±0.1 mm. For the same reason, the timing of operation of the holding members 105 is not affected by that of operation of the thrust-out pins 104.

According to the present invention, air is ejected prescribed pressure to the central portion of a molded piece such as a plastic shutter nearly at the same time as the shutter is thrust out from a die unit by thrust-out pins after the injection molding of the piece inside the unit and the subsequent mutual opening of the right and left slide dies of the unit. For that reason, the piece does not tilt or drop, and is held at both sides thereof in a prescribed position by the holders of a takeout device and is stably removed from the die unit by the device. The rapidly and accurately molded piece is thus protected from positional deviation when the piece is removed from the die unit. This makes it possible to maintain the quality of the finished piece, and the manufacturing operation therefor, stable. Further, it allows for rapid removal of the piece from the die unit. Since the air is ejected to the molded piece to push it on the thrust-out pins, the length of the thrusting-out of the piece can be increased to easily augment the area of contact of the holders with the piece to lightly and securely hold the piece and to rapidly take it out from the die unit without running the risk of deforming the piece, even if the piece is high in temperature and small in thickness. The preferred embodiments relate to a shutter for a disk cartridge. However, the invention can be applied to any molded piece which must be removed from a mold. Also, the control and timing of the various components of the invention can be accomplished through known devices such as a microprocessor-based controller or a hard-wired relay device.

In an injection-molded piece takeout method provided in accordance with the present invention, an injection-molded piece takeout device is set so that the holding members thereof have holding surfaces parallel with the held sides of an injection-molded piece, and are moved into the space between the molding dies of an injection molding die unit in parallel with the held sides. If the molded piece is very small in thickness and is low in accuracy of positioning, the piece would be very likely to be deformed at the time of holding thereof by the holding members in the conventional method. However, in the method provided in accordance with the present invention, the holding members are moved into the space between the dies so that the holding surfaces of the members extend along the held sides of the piece before holding it. For that reason, the operation of the holding members at the time of holding of the molded piece by them is not affected by the vibration of the members due to the movement thereof into the space between the dies but is stabilized s that the holding surfaces of the members are accurately positioned to properly hold the molded piece to take it out from the die unit. Since the holding members are moved into the space between the dies so that the holding surfaces of the members extend along the held sides of the molded piece, the timing of the movement of the members into the space is not affected by that of the operation of thrust-out pins for thrusting out the molded piece from the die. For that reason, the movement can be simplified to shorten the time which it takes to take out the molded piece from the die unit.

The invention has been described through preferred embodiments. However it will be apparent to those skilled in the art that various modifications can be made thereto without departing from the scope of the invention as defined by the appended claims.

What is claimed is:

1. A method for removing an injection molded piece from a molding die unit in which movable mold members of said molding die unit are moved away from each other, after molding material has been injected into said molding die unit, so as to open said molding die unit, said method comprising the steps of:

moving at least one thrust pin through a predetermined distance so as to push the molded piece away from a space defined between said movable mold members when said molding die unit is opened; and jetting a fluid toward a surface of the piece so as to push the molded piece against said at least one thrust pin and hold the molded piece in a predetermined position with respect to said at least one thrust pin.

2. A method as claimed in claim 1 wherein said moving step and said jetting step occur simultaneously.

3. A method as claimed in claim 1 wherein said molded piece is a shutter for a data disk cartridge, and the fluid is jetted in a direction which is in opposition to movement of said at least one thrust pin.

4. A method as claimed in claim 1 wherein there are two thrust pins.

5. A method as claimed in claim 1 wherein the fluid is air.

6. A method as claimed in claim 1, further comprising the step of:

moving holding members toward said molded piece so as to bring said holding members into contact with said molded piece after said moving step is completed.

7. A method as claimed in claim 6 wherein said holding members are moved at least in a direction which is transverse to the movement of said thrust pins.

8. A device for removing an injection molded piece from a molding die unit which includes movable mold members which are moved away from each other so as to open said molding die unit, said device comprising:

at least one thrust pin;

thrust pin moving means for moving said at least one thrust pin in a first direction so as to engage with the molded piece and move the molded piece through a predetermined distance;

a fluid ejection nozzle disposed in opposition to said thrust pins, said fluid ejection nozzle being directed in a direction which is opposed to said first direction and positioned so as to hold the molded piece in a predetermined position with respect to said thrust pin when a fluid is jetted through said nozzle; and means for jetting a fluid through said fluid ejection nozzle so as to cause said fluid to impinge on a surface of the molded piece as the molded piece is moved by said at least one thrust pin so as to hold the molded piece in a predetermined position with respect to said thrust pin.

9. A device as claimed in claim 8, wherein said thrust pin moving means and said jetting means operate simultaneously.

10. A device as claimed in claim 8, wherein said molded piece is a shutter for a data disk cartridge.

11. A device as claimed in claim 8, wherein there are two thrust pins.

12. A device as claimed in claim 8, wherein the fluid is air.

13. A device as claimed in claim 8, further comprising:

holding members; and holding member moving means for moving said holding members into contact with the molded piece after the molded piece has been moved through said predetermined distance.

14. A device as claimed in claim 13, wherein said holding member moving means moves said holding members at least in a direction which is transverse to the movement of said thrust pins.

* * * * *